United States Patent [19]

Lackman et al.

[11] 4,256,790
[45] Mar. 17, 1981

[54] REINFORCED COMPOSITE STRUCTURE AND METHOD OF FABRICATION THEREOF

[75] Inventors: Leslie M. Lackman, Tarzana; John A. Hill, Lawndale, both of Calif.

[73] Assignee: Rockwell International Corporation, Los Angeles, Calif.

[21] Appl. No.: 870,684

[22] Filed: Jan. 19, 1978

[51] Int. Cl.³ .............................................. B32B 3/12
[52] U.S. Cl. ........................................ 428/73; 28/141; 52/309.1; 156/93; 428/102; 428/116; 428/286; 428/408
[58] Field of Search ............... 428/102, 103, 104, 116, 428/117, 118, 286, 408; 156/91, 92, 93, 197; 52/309.1, 309.2; 28/141

[56] References Cited

U.S. PATENT DOCUMENTS

| | | | |
|---|---|---|---|
| 2,166,578 | 7/1939 | Bernhardt | 428/102 X |
| 2,228,691 | 1/1941 | Crosser | 428/11 X |
| 3,239,403 | 3/1966 | Williams et al. | 156/275 |
| 3,246,621 | 4/1966 | Copeland | 156/93 X |
| 3,544,417 | 12/1970 | Corzine | 156/93 X |
| 3,617,416 | 11/1971 | Kromrey | 428/118 X |
| 3,657,058 | 4/1972 | Tokita et al. | 428/161 X |
| 3,949,113 | 4/1976 | Draper et al. | 428/57 X |
| 3,953,641 | 4/1976 | Marquis | 428/295 X |
| 3,960,236 | 6/1976 | Holmes | 428/102 X |
| 4,010,300 | 3/1977 | Wallin | 156/92 X |
| 4,051,290 | 9/1977 | Jutte et al. | 428/209 X |
| 4,052,523 | 10/1977 | Rhodes et al. | 428/116 |
| 4,109,435 | 8/1978 | Loyd | 156/92 X |
| 4,171,999 | 10/1979 | Allen | 156/92 X |

*Primary Examiner*—Henry F. Epstein
*Attorney, Agent, or Firm*—Charles T. Silberberg

[57] ABSTRACT

A composite structure has two composite panels which are bonded together at a joint. The joint is reinforced by composite thread being sewn in a series of stitches through the panels. Sewing the panels while they are in a staged condition allows the structure to be co-cured as assembled.

14 Claims, 8 Drawing Figures

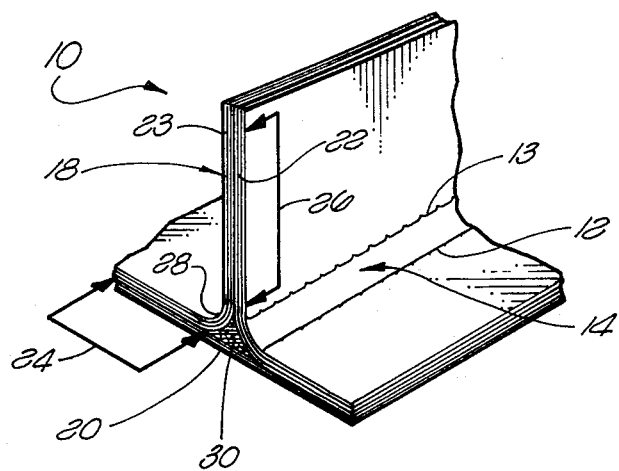
FIG. 1
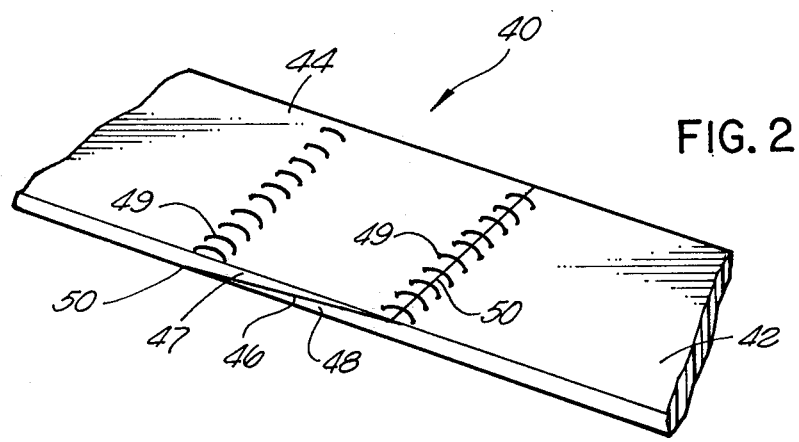
FIG. 2
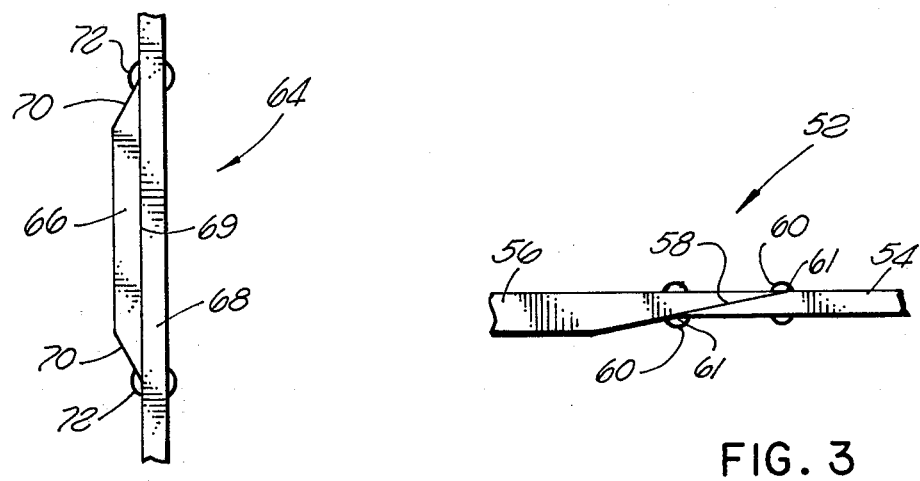
FIG. 3
FIG. 4

REINFORCED COMPOSITE STRUCTURE AND METHOD OF FABRICATION THEREOF

BACKGROUND OF THE INVENTION

The present invention generally relates to a reinforced composite structure. More particularly, the invention is directed to a composite structure which is reinforced and assembled using composite thread. The composite thread, by holding together the formed details, allow assembly of the composite structure while in a staged condition such that the entire structure can be co-cured (curing of each member of the structure at the same time) and bonded in one operation. In addition, by strategically sewing the stitches of composite thread in the structure, peel forces on the structural joint are minimized.

Usage of composite materials in structures has been increasing rapidly. This is particularly true in the aerospace industry where the lightweight, high-strength characteristics of these materials are particularly desirable. In this art, strong, lightweight, tough, self-sustaining sheet material has been developed, these materials being composed as a class of a resinous sheet reinforced with layers of continuous, lineally aligned, parallel filaments. These sheets may be formed as a single layer sheet or as a multi-layer laminates, and thereafter thermoset to tough, hard, exceptionally strong panels, or skins for aircraft and the like.

As initially formed, these sheet materials are flexible and deformable, providing panel-forming members which can be draped or othewise conformed to various shapes and thereafter cured, by thermosetting, upon the application of heat and pressure thereto, to tough, strong skins or panels of permanent shape retention and having exceptional tensile strength imparted by the continuous filament reinforcing.

Panels or skins made up of these materials are exceptionally strong, lightweight structural units. However, structures made by the inclusion of reinforcing ribs or the like on such panels have heretofore seen limited applicability. Presently, these skins or panels are typically joined by first curing the sheet material into the desired shape and adhesively bonding a web or rib structure to the panel through the medium of a thermosetting adhesive.

However, as previously stated, uncured composite structure is flexible and deformable and when curing large combined structural members, such as an aircraft wing box, difficulties have been encountered in holding the parts in place, especially when transporting the structure to an autoclave or oven. Further, it has been found that tension loads, at unacceptably low values, on the cured panel or skin of the composite structure result in "peel" forces which tend to separate the web and panel of the structure at their interface (joint). cl PRIOR ART STATEMENT Due to the formable nature of uncured composite laminated sheets, the current practice in fabricating a structure has been to individually cure the elements of the structure prior to assembly. A further bonding or fastening operation is necessary once the structure is assembled. Various attempts have been made to solve the peeling problem in rib cap to panel bonded joints under tension load. Thus, metal rivets and bolts have been used as fasteners at the interface of the composite rib/sheet joints. Unfortunately, this has increased the weight of the resulting structure because of requiring more plies of material due to the reduced laminate strength resulting from the necessary drilled fastener holes, increased fabrication time, and presented sealing problems where the panel forms part of a container, such as a fuel tank. Imbedding a metal "T" element into a joint has also been utilized. This has also been found to be unsatisfactory in that the element is expensive, increases the weight of the structure, requires a critical priming operation, is incompatible with the surrounding material due to its higher thermal co-efficient of expansion, and is too rigid, thereby resulting in a notch effect.

It has now been found that composite thread according to the present invention can be easily inserted into a staged composite structure with minimal disturbance to the fibers. By pulling the threads taut, the elements of the staged structure are held together. With bolts or rivets, holes must be drilled in the elements of the structure which cuts the composite fibers, and are subject to the above noted disadvantages. Further, there is normally no access to install corresponding fastener nuts (with of course the additional configuration problems due protrusion of the nut). Moreover, the composite elements are too soft, even in the staged condition, for efficient hole drilling and for the bolts to be effectively grip the material. It has also been found that composite thread according to the present invention is cheaper and lighter than bolts or rivets, can be stitched into the structure much quicker, does not waste material in that fastener holes are not required (though holes are required for the thread to pass through, their size is quite small), and results in only minimal disturbance to the composite fibers of the structure when sewn. In addition, by positioning the stitches of composite thread strategically, the strength of the structure is increased.

SUMMARY OF THE INVENTION

It is, therefore, an object of the present invention to provide a reinforced composite structure having a joint with increased resistance to peel forces.

It is another object of the present invention to provide an efficiently fastened composite structure with unimpaired structural strength.

It is still another object of the present invention to provide a method of fabrication which allows co-curing and bonding of the assembly and results in a reinforced composite structure.

Briefly, in accordance with the invention, there is provided a reinforced composite structure comprising two composite panels. Each panel has a plurality of fiber composite plies which are adhesively bonded together. The panels are adhesively bonded together at a joint. Composite thread sewn in a series of stitches through the panels reinforces the joint.

In another form of the present invention, a method is provided of forming a reinforced composite structure which comprises staging two composite panels, each of the panels having a plurality of fiber composite plies which are adhesively bonded together, joining the panels together by sewing a series of stitches of composite thread through the panels, and co-curing the panels as joined.

BRIEF DESCRIPTION OF THE DRAWINGS

FIG. 1 is a fragmentary perspective view of a reinforced composite structure according to the present invention illustrating a joint reinforced by stitching using composite thread;

FIG. 2 is a fragmentary perspective view of another form of reinforced composite structure illustrating a joint thereof reinforced by stitching with composite thread;

FIG. 3 is a fragmentary elevational view of a reinforced composite structure similar to the FIG. 2 embodiment illustrating a joint of panels of the structure which are of different thicknesses which is reinforced by stitching with composite thread;

FIG. 4 is a fragmentary elevational view of a doubler fastened to a web where the edges of the doubler are stitched with composite thread to the web;

Figure 5:
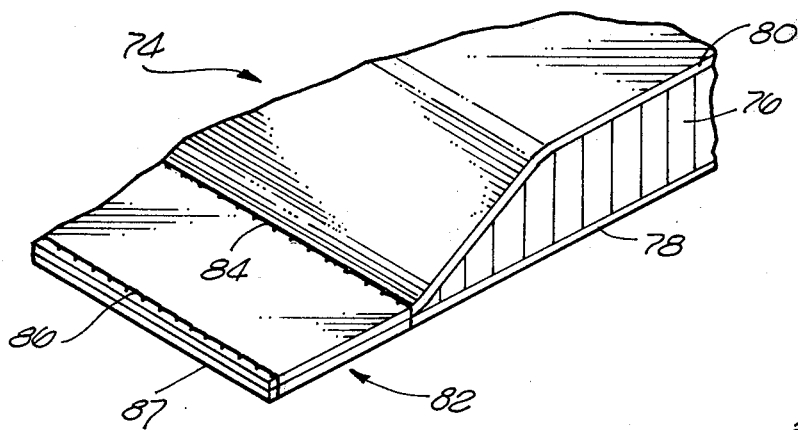
FIG. 5 is a fragmentary perspective view of a honeycomb structure having a honeycomb core between two composite panels illustrating the stitching with composite thread to reinforce the joint.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as described by the appended claims.

DETAILED DESCRIPTION OF THE INVENTION

Referring now to FIG. 1, there is shown according to the present invention, a reinforced composite structure generally indicated at 10. Structure 10 utilizes composite fiber stitching 12 and 13 to reinforce the structural joint generally indicated at 14 which is defined by the connection of a composite web generally indicated at 18 and composite panel or skin 20. Both web 18 and panel 20 are normally laminates of a plurality of fiber composite plies. Normally web 18 would be joined to an upper panel or spar cap (not shown). Web 18 is made up of opposed composite sheets 22 and 23 (which can each include a number of plies). A portion 24 of each of sheets 22 and 23 is positioned parallel and adjacent to panel 20. As can be seen, the portion 24 of sheet 22 diverges from the corresponding portion 24 of sheet 23. A second portion 26 of sheets 22 and 23 extends transversely to panel 20. In the embodiment illustrated in FIG. 1, the second portion 26 is approximately orthogonally disposed to panel 20. Web 18 also has a fillet portion 28 between first portion 24 and second portion 26. Positioned between sheets 22 and 23 of web 18 and panel 20 is a composite filler material 30 which can be made of chopped composite fiber or the like. A thermosetting adhesive is placed on the contacting surfaces of web 18, skin 20, and the filler 30, but is not sufficient to hold these members in assembled condition at room temperature prior to curing.

In the uncured condition, the composite sheet materials are flexible and deformable. After conforming them to the desired shape, the composite members are, according to the present invention, staged which gives them a stiffness at room temperature which allows the members to be assembled and fastened by use of the composite thread herein described to the desired form. Staging is accomplished by heating to a temperature normally less than the curing temperature and compressing the composite members. Specifically, it has been found that graphite epoxy laminates can be heated to a temperature of about 175° F. for about 30 minutes to one hour while simultaneously compressed to cause bleeding (getting rid of excess resin) to result in a member which is suitably staged for the present invention.

In the staged condition, the composite members will still normally be too soft to allow the installation of bolts in view of the difficulty of hole drilling. In any case, as previously described, hole drilling is time consuming, wastes material, results in fuel sealing problems, cuts the composite fibers, requires the use of extra plies, and does not overcome the problem of access to apply the corresponding nuts and bolts. However, in the staged condition, the composite thread can be easily sewn through the composite panels.

A preferred form of composite fiber thread is made by taking a strip of uncured unidirectional composite fiber tape and rolling it to form a round-shaped thread. Some of the composite materials which can be used are Kevlar, fiberglass, Dacron, and nylon. Alternately, instead of rolled tape, composite yarn may be used. In the uncured condition, the thread is sufficiently flexible to be sewn through the members to be joined. Preferably, one end of the thread is cured. This end acts as a needle for pulling the thread through the members to be joined.

In sewing the composite thread through the composite panel members, it is necessary to form aligned holes in the panels through which the thread can pass. As these holes need only accommodate the composite thread, they are substantially smaller than those which would be necessary for fasteners such as bolts. In addition, these holes are filled during the curing of the structure. The holes can be formed by use of a high-speed rotating awl. It has been found that the high-speed awl generates heat when rotating which helps to part the fibers of the staged composite material so that only minimal fiber damage (which would otherwise impair structural strength) results. A preferred method of forming the hole is to place an awl in an ultrasonic gun which vibrates the awl. The vibration heats up the awl tip and in so doing softens the staged composite panels in the area of the insertion which aids in parting the composite fibers by making them more pliable. This action again results in only very minimal fiber damage as opposed to the holes drilled for typical fasteners which cause substantial fiber breakage.

Figure 6:
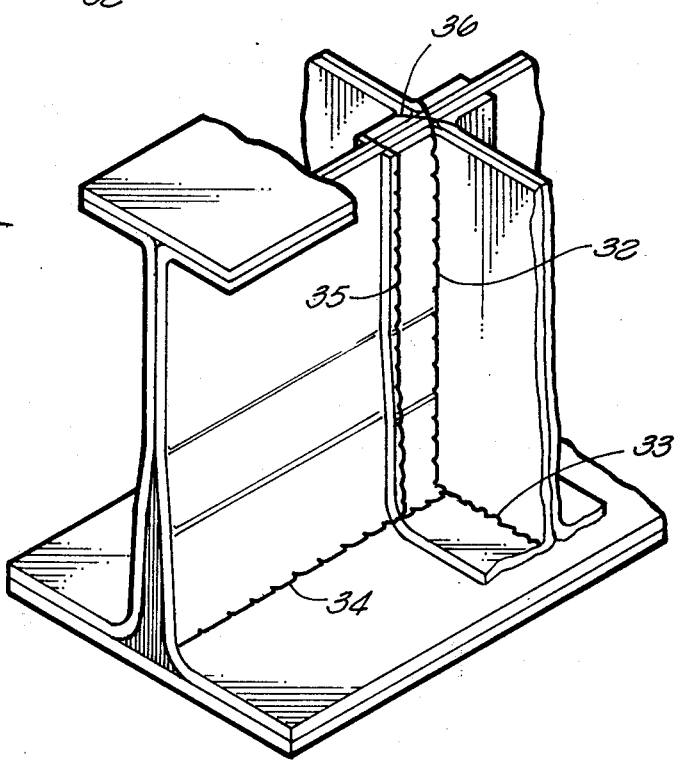
FIG. 6 is a perspective view of a composite structure illustrating the stitching with composite thread as an assembling means to hold structures together while co-curing.

FIG. 6 illustrates a complex composite structure generally indicated at 31 where the function of the stitching 32, 33, 34, 35, and 36 in joining the assembly in the staged condition is graphically illustrated. The numerous panels of such a structure 31 are simply fastened together with the composite thread to allow for layup and co-curing of the composite structure as opposed to curing of each of the individual parts prior to layup and curing of the entire assembly. With the present invention, subsequent to layup, the individual parts and structure as a whole are co-cured in one operation. This allows large complex structures, such as the wing box illustrated in FIG. 6, to be co-cured in one operation. It saves time and expense of multiple curing operations and difficulties in joining of rigid cured parts. The stitching further adds strength to the structural joint as more fully described hereinafter.

Curing of the assembly, such as 31, is accomplished by thermosetting on the application of heat and pressure to the composite structure. Typically, when curing an assembly such as that shown in FIG. 6, which is of graphite epoxy material, the assembly would be placed in a sealed plastic bag and then into an autoclave or oven. A vacuum would be drawn on the inside of the bag allowing atmospheric pressure to exert a force on the outside of the bag to the structural surface. The assembly would be heated to a temperature of about 350° F. for about one hour whereupon the panels of the structure become tough and strong and have a permanent shape retention and the assembly itself becomes permanently joined. The composite fiber thread utilized in the stitching becomes permanently bonded to the structure by virtue of the curing of the resin around the thread.

With reference again to FIG. 1, a significant prior art problem with composite structures of this type, as previously stated, has been that the epoxy bond at the joint 14 where portions 24 of web 18 are bonded to panel 20 would, under a tension load applied to panel 20, without reinforcement (as by the prior art methods or by the sewing of the present invention), at undesirably low levels, be insufficient to prevent a peeling of web 18 from panel 20 at fillet areas 28. With the present invention, however, it has been found that by sewing with composite thread the structure 10 adjacent to fillet areas 28, the resistance of joint 14 to peel forces is substantially increased without the problems of the prior art. Specifically, a series of stitches 12 extending parallel to web 18 is sewn on opposite sides of web 18 through portions 24 and panel 20 adjacent to fillet areas 28. Optimally, another series of stitches 13 is sewn through portion 26 of web 18 adjacent to fillet area 28. Stitches 13 also extend parallel to web 18. Normally, stitches 12 and 13 will as shown extend the full length of web 18. However, this is not requred. By strategically positioning stitching 12 and 13 as shown, peel forces on the joint 14 which are particularly large at fillet areas 28 are opposed without impairing structural strength due to fastener holes and tearing of fibers.

FIGS. 2-5 illustrate variations of the structure shown in FIG. 1. In FIG. 2 the structure generally indicated at 40 illustrates a composite panel splice where two composite panels 42 and 44 of the same thickness are bonded together with a thermosetting adhesive at joint 46. Panels 42 and 44 have tapered ends 47 and 48 respectively which overlie one another to form joint 46. Composite fiber stitches 49 are sewn across the edges 50 of joint 46. After co-curing, the composite fiber stitches 49 which are bonded to panels 42 and 44 reinforce joint 46 by opposing peeling of edges 50 under a tension load.

FIG. 3 illustrates a splice similar to that shown in FIG. 2 where the structure generally indicated at 52 is formed by panels 54 and 56 which are connected at a joint 58 defined by the ends of panels 54 and 56 which are bonded together. However, while in this embodiment panel 56 is thicker than panel 54, the approach to reinforcing is accomplished in the same manner with stitches 60 sewn across edges 61 of the joint.

In FIG. 4 the structure generally indicated at 64 has a doubler 66 adhesively bonded to a portion of web 68 at joint 69. Doubler 66 (which is a panel which overlies a portion of web 68 to increase thickness of that portion) is normally tapered at its ends 70. Composite fiber stitches 72 are sewn through doubler 66 and web 68 preferably at or near the periphery of ends 70. By such fastening, joint 69 is reinforced by increased resistance to peeling forces on joint 69 under tension load to structure 64 which would otherwise normally result in peeling of ends 70 from web 68 at undesirably low values of tension.

FIG. 5 illustrates a honeycomb structure generally indicated at 74. A honeycomb core 76 is positioned between composite panels 78 and 80. Panels 78 and 80 are bonded to core 76 with a thermosetting adhesive. Panels 78 and 80 are also bonded to each other with a thermosetting adhesive at the flange generally indicated at 82. Stitching 84 with composite thread through panels 78 and 80 is made on the edge of flange 82 which is adjacent to core 76. Such stitching 84 reinforces the bonding along such edge to increase resistance to peeling which normally occurs at this location at undesirably low tension loads on structure 74. Stitching 86 with composite thread through panels 78 and 80 is preferably made adjacent the distal end 87 of flange 82. Stitching 86 opposes delamination of flange 82 which normally often results in damage to flange 82.

Figure 7:
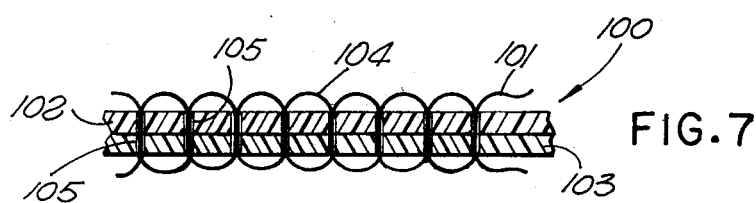
FIGS. 7 and 8 are detail views illustrating lock stitches and blind stitches respectively for use in the present invention.
Figure 8:
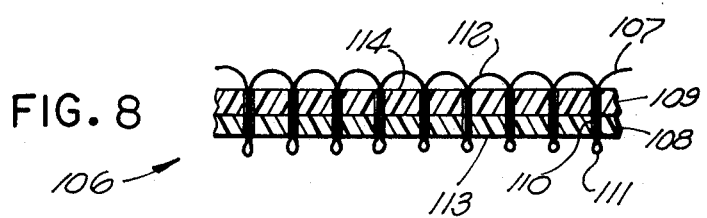

FIGS. 7 and 8 show detail views of different stitches of composite thread which can be used in the present invention. In FIG. 7 there is shown a joint generally indicated at 100 where composite thread 101 is stitched through composite panels 102 and 103. In this embodiment, lock stitches 104 are used. This is the preferred form of stitch where access is available to both sides of the structure. This is accomplished by the thread 101 being inserted in one of the aligned holes 105 though panels 102 and 103 in one direction, and then inserted in the opposite direction in the next adjacent hole 105 in the series, and so on until the series of holes 105 is completely sewn. As previously explained, in the uncured condition thread 101 is sufficiently flexible to accomplish such sewing. Also, by pulling the thread taut after sewing, panels 102 and 103 will be held together even though in the staged condition and as such can be co-cured.

FIG. 8 illustrates a joint generally indicated at 106 where composite thread 107 is sewn through panels 108 and 109. In this embodiment, the thread pattern of blind stitching is illustrated. This type of stitching is normally used where access to one side of the structure is limited. In the embodiment illustrated, the bottom of panel 108, i.e. where panel 108 is a surface of a fuel tank, would have limited access. A tool (not shown) pushes the thread 107 through preformed holes 110 leaving loops 111 on the inaccessible side 113 and loops 112 on the accessible side 114. Loop 112 is pushed flush agint surface 114 by the bagging operation which uses atmospheric pressure to press the bag to surface 114 after the inside of the bag has been subjected to a vacuum. Thread 107 is bonded to panels 108 and 109 during the curing operation.

Thus, it is apparent that there has been provided, in accordance with the invention, a reinforced composite structure and method of fabrication thereof that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and scope of the appended claims.

What is claimed is:

1. A reinforced cured composite structure comprising:

a first composite panel, said first panel having a plurality of fiber composite plies, said plies being adhesively bonded together;

a second composite panel, said second panel having a plurality of fiber composite plies, said plies being adhesively bonded together, said second panel being adhesively bonded to said first panel at a joint between said first panel and said second panel; and composite thread reinforcing said joint, said thread being sewn in a series of stitches through said first panel and said second panel.

2. The reinforced composite structure of claim 1 wherein said composite thread is made from unidirectional composite tape.

3. The reinforced composite structure of claim 1 wherein said composite thread is bonded to said panels.

4. The reinforced composite structure of claim 1 wherein at least some of said stitches are of the lock type.

5. The reinforced composite structure of claim 1 wherein at least some of said stitches are of the blind type.

6. The reinforced composite structure of claim 1 wherein said second panel is a web, said web having three portions, a first portion positioned parallel to said first panel, a second portion positioned transversely to said first panel, and a fillet portion between said first and second portion, and thread being sewn through said first portion adjacent to said fillet portion.

7. The reinforced composite structure of claim 6 wherein said composite thread is sewn in a series of stitches through said second portion adjacent to said fillet portion.

8. The reinforced composite structure of claim 1 wherein each of said composite panels has one edge that is tapered, said tapered edges being bonded together to form said joint, said composite thread being sewn through said joint.

9. The reinforced composite structure of claim 1 wherein said second panel is a doubler and said doubler overlies said first panel.

10. The reinforced composite structure of claim 1 also including a honeycomb core, said core being positioned between said first panel and said second panel, said core being bonded to said first panel and said second panel, and wherein said second panel has three portions, a first portion positioned parallel to said first panel, said first portion being bonded to said first panel, a second portion positioned parallel to said first panel and bonded to said core, and a third portion connecting said first and second portions and positioned transversely to said first panel, said thread being sewn through said first portion and said first panel adjacent to said third portion.

11. The reinforced composite structure of claim 10 wherein said first portion is bonded to a corresponding portion of said first panel, said first portion and said corresponding portion forming a flange of said structure, said flange having a distal end, said thread also being sewn through said first portion and said corresponding portion adjacent said distal end.

12. The reinforced composite structure of claim 1 wherein said composite panels are made of graphite epoxy laminates.

13. The reinforced composite structure of claim 6 wherein said composite panels are made of graphite epoxy laminates.

14. The reinforced composite structure of claim 1 wherein said sewn composite thread and said first and second panels are co-cured.

* * * * *